(12) United States Patent
Durjan et al.

(10) Patent No.: US 7,625,268 B2
(45) Date of Patent: Dec. 1, 2009

(54) FISH CLEANING APPARATUS

(76) Inventors: Earl Durjan, 9617 Avenue L, Brooklyn, NY (US) 11236; Malcolm Durjan, 9617 Avenue L, Brooklyn, NY (US) 11236

(*) Notice: Subject to any disclaimer, the term of this patent is extended or adjusted under 35 U.S.C. 154(b) by 0 days.

(21) Appl. No.: 12/317,665

(22) Filed: Dec. 23, 2008

(65) Prior Publication Data
US 2009/0163129 A1 Jun. 25, 2009

Related U.S. Application Data

(60) Provisional application No. 61/008,648, filed on Dec. 24, 2007.

(51) Int. Cl.
A22C 25/02 (2006.01)
(52) U.S. Cl. .................................................. 452/103
(58) Field of Classification Search ............... 452/1–11, 452/102–105; 119/600–604, 608, 611, 613
See application file for complete search history.

(56) References Cited

U.S. PATENT DOCUMENTS

| | | | | |
|---|---|---|---|---|
| 2,884,658 A | * | 5/1959 | Johnson | 452/133 |
| 2,928,118 A | * | 3/1960 | Hairston | 452/81 |
| 3,667,086 A | * | 6/1972 | Sexton | 452/81 |
| 4,258,452 A | * | 3/1981 | Adcock et al. | 452/81 |
| 4,297,765 A | * | 11/1981 | Altman et al. | 452/81 |
| 4,339,850 A | * | 7/1982 | Altman et al. | 452/81 |
| 4,615,079 A | * | 10/1986 | Chartrand | 452/81 |
| 5,823,145 A | * | 10/1998 | Hingiss | 119/603 |
| 6,024,052 A | * | 2/2000 | Efaw | 119/625 |
| 6,367,421 B1 | * | 4/2002 | Deacon | 119/603 |
| 6,857,951 B1 | * | 2/2005 | Pauley | 452/102 |
| 6,948,451 B2 | * | 9/2005 | Bond et al. | 119/665 |
| 7,179,162 B1 | | 2/2007 | Twiner | |

\* cited by examiner

Primary Examiner—Thomas Price
(74) Attorney, Agent, or Firm—James Ray & Assoc.

(57) ABSTRACT

An apparatus for cleaning fish includes a scaling tool, a brushing device, rustproof scissors and a water nozzle. Each of the scaling tool the brush the rustproof scissors and the water nozzle have a water connection mechanism disposed at one end thereof for connecting them to a source of water. There is a water communication outlet port formed in each of them for allowing water to exit therefrom. Further there is at least one water communication channel connected at a first end thereof to the water connection device and at a second end thereof to the water communication outlet port for communicating water from the source to the outlet port.

20 Claims, 6 Drawing Sheets

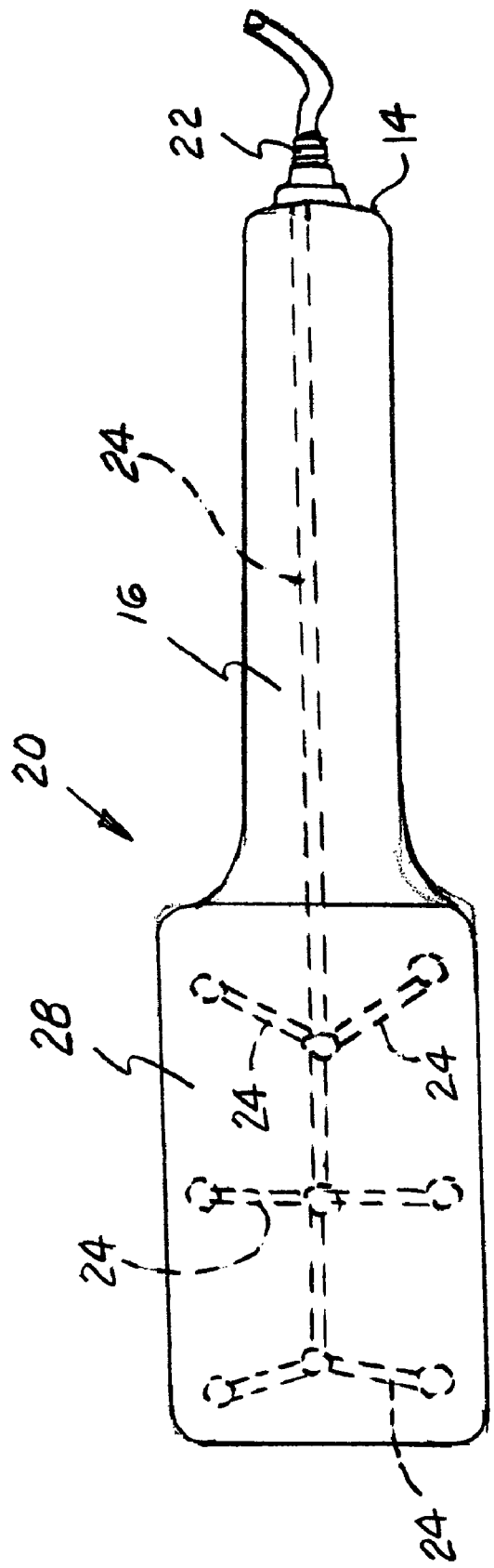
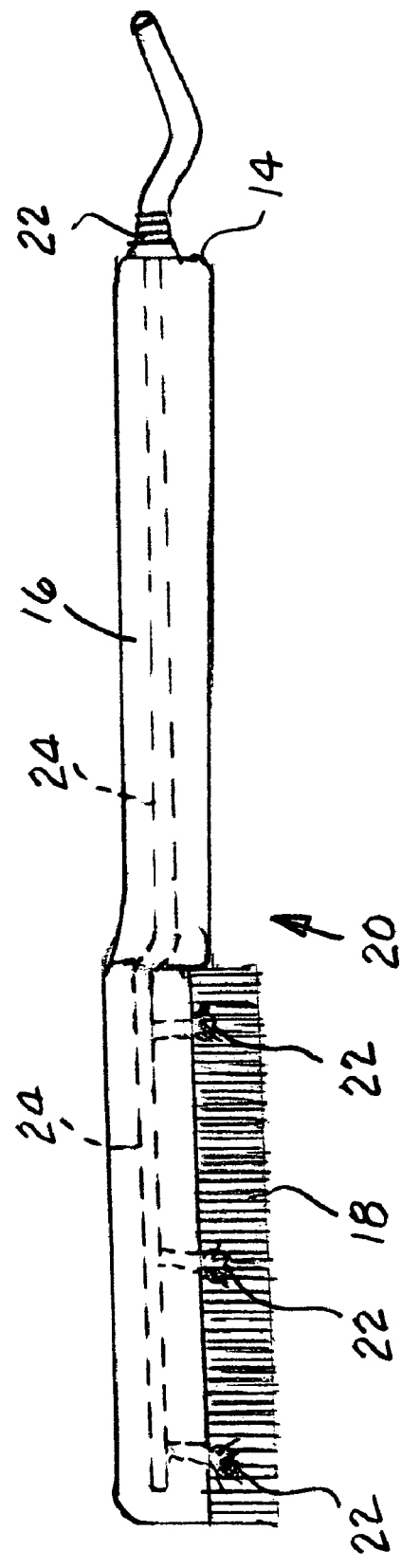
FIG. 3
FIG. 4

FISH CLEANING APPARATUS

CROSS REFERENCE TO RELATED APPLICATION

This patent application is related to and claims priority from U.S. Provisional Patent Application Ser. No. 61/008,648 filed Dec. 24, 2007. Such U.S. Provisional Patent Application Ser. No. 61/008,648 is incorporated herein by reference thereto.

FIELD OF THE INVENTION

The present invention relates, in general, to cleaning fish and, more particularly, this invention relates to a multi-function apparatus for use in cleaning fish.

BACKGROUND OF THE INVENTION

Prior to the conception and development of the present invention, as is generally well known in the prior art, fish must be at least scaled and gutted prior to cooking. One of the primary tools used by fishermen for this purpose, prior to the instant invention, has been a knife. The reason the knife is widely used is that it can be used to scrape the scales from the exterior of the fish as well as to cut open the stomach to enable removing organs of the fish which must be removed.

However, in large scale fish cleaning operations additional tools designed for a specific use must be utilized. Furthermore, a relatively large amount of space is required for all of these different tools, a source of water, the fish debris as well as other items. Additionally, the traditional way of cleaning fish requires washing between each step which becomes a time consuming and messy process for the person doing the cleaning.

SUMMARY OF THE INVENTION

The present invention provides, in a first embodiment, an apparatus for cleaning fish. The apparatus includes a scaling tool having each of a first predetermined shape and a first predetermined size. There is a first water connection means disposed at a predetermined end of the scaling tool for connecting such scaling tool to a source of water. At least one water communication outlet port is formed in the scaling tool at a predetermined location for allowing water to exit said scaling tool. There is also at least one water communication channel connected at a first end thereof to the first water connection means and at a second end thereof to the at least one scaling tool water communication outlet port for communicating water from the water source to the outlet port. Additionally, the apparatus includes a brush means having each of a second predetermined shape, a second predetermined size and a predetermined stiffness for cleaning a belly, a head and a body such fish. A second water connection means is disposed at a predetermined end of the brush means for connecting such brush means to a source of water. At least one water communication outlet port is formed in the brush means at a predetermined location for allowing water to exit such brush means. There is also at least one water communication channel connected at a first end thereof to the second water connection means and at a second end thereof to the at least one brush means water communication outlet port for communicating water from the water source to the outlet port. The apparatus also includes a rustproof scissors having a pair of blades which have a predetermined length. A third water connection means is disposed at a predetermined end of a predetermined one of a handle member connected to one end of each of the pair of blades for connecting the rustproof scissors to a source of water. At least water communication outlet port is formed in a predetermined one of the pair of blades at a predetermined location for allowing water to exit the predetermined one of such pair of blades. Further, there is at least one water communication channel connected at a first end thereof to the third water connection means and at a second end thereof to the water communication outlet port for communicating water from the water source to the outlet port. Lastly, the apparatus includes a water nozzle having a predetermined number of sprays. There is a fourth water connection means disposed at a predetermined end of the water nozzle for connecting such water nozzle to a source of water. At least one water nozzle water communication outlet port is formed in the water nozzle at a predetermined location for allowing water to exit such water nozzle and at least one water communication channel is connected at a first end thereof to the fourth water connection means and at a second end thereof to the at least one water nozzle water communication outlet port for communicating water from the water source to the outlet port.

According to another embodiment, the present invention provides the apparatus described above in combination with a fish cleaning station having at least one sink, a drain table sloped to said at least one sink for holding a fish to be cleaned and a source of water.

OBJECTS OF THE INVENTION

It is, therefore, one of the primary objects of the present invention to provide an apparatus for cleaning fish which is relatively easy to use.

Another object of the present invention is to provide an apparatus for cleaning fish which requires less space in cleaning large numbers of fish.

Still another object of the present invention is to provide an apparatus for cleaning fish which is less time consuming due to it being unnecessary to spend time washing and changing tools.

Yet another object of the present invention is to provide an apparatus for cleaning fish which produces less mess from the cleaning operation.

An additional object of the present invention is to provide an apparatus for cleaning fish which is less tiring when cleaning large numbers of fish.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

BRIEF DESCRIPTION OF THE DRAWINGS

FIG. 3 is a plan view of a presently preferred embodiment of a scaling tool used in the apparatus of the invention;

FIG. 4 is a side elevation view of the scaling tool illustrated in FIG. 3;

Figure 1:
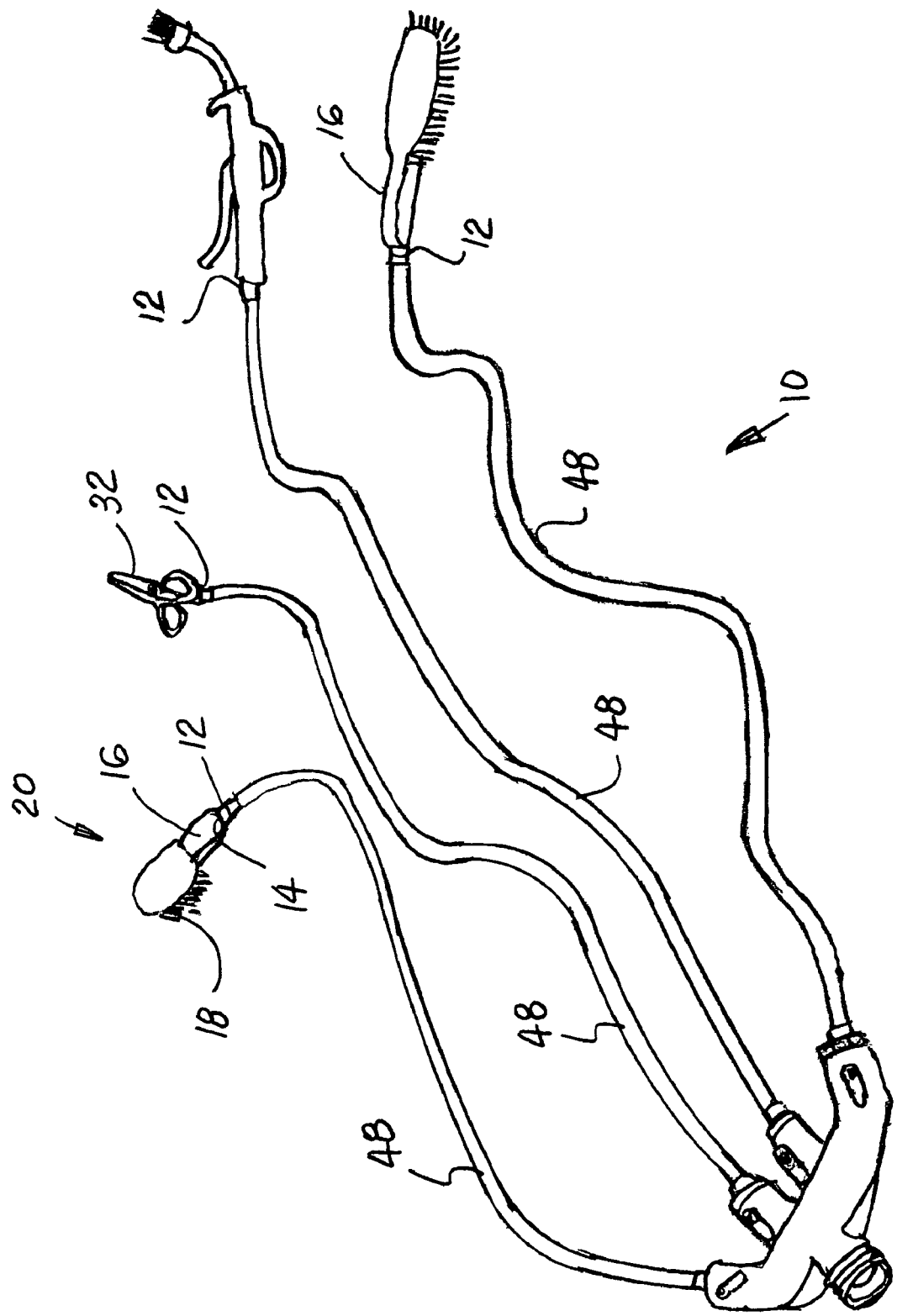
FIG. 1 is a perspective view of a presently preferred embodiment of the fish cleaning apparatus.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 2:
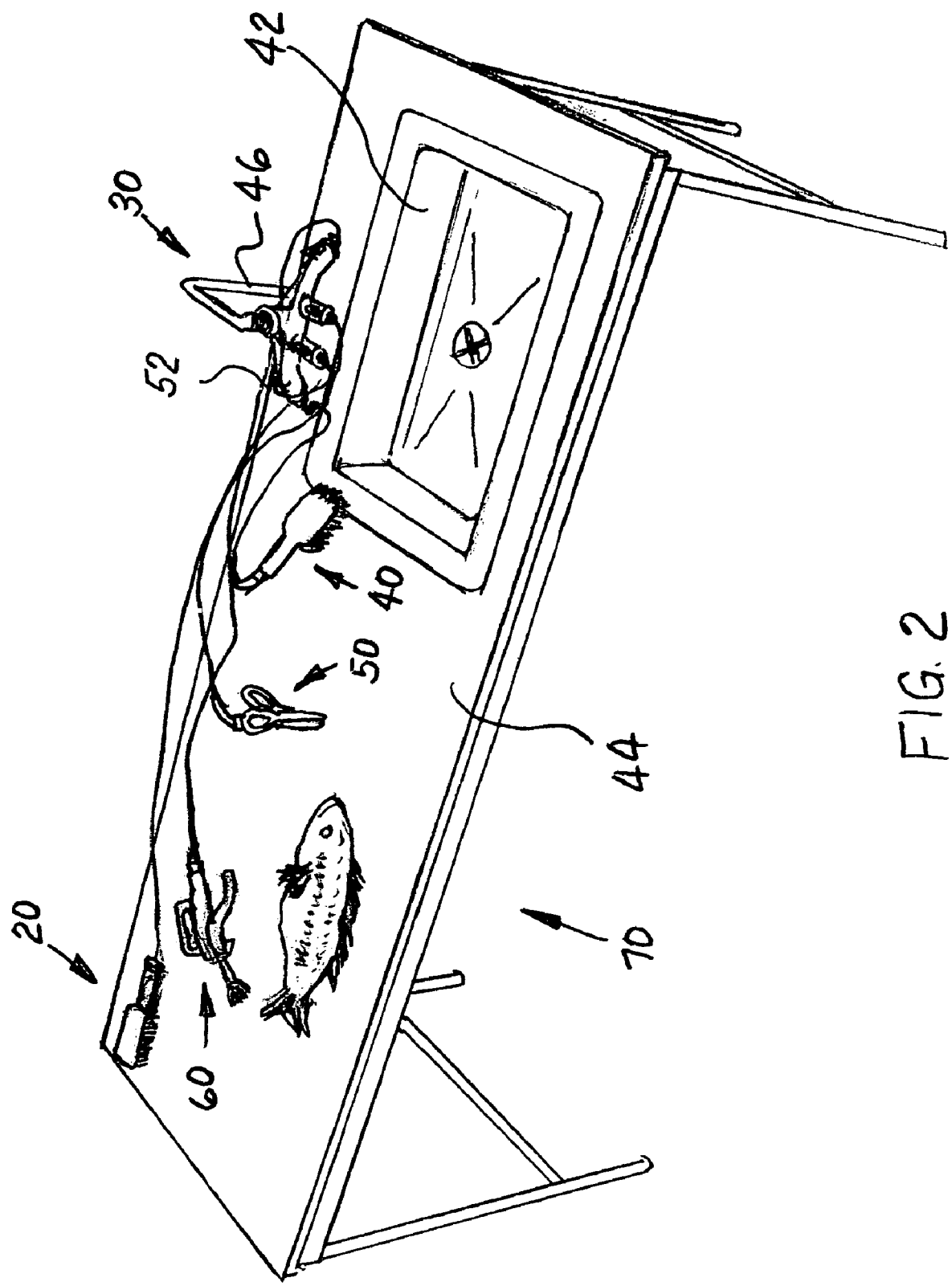
FIG. 2 is a perspective view of a combination fish cleaning station using the apparatus illustrated in FIG. 1.
Figure 5:
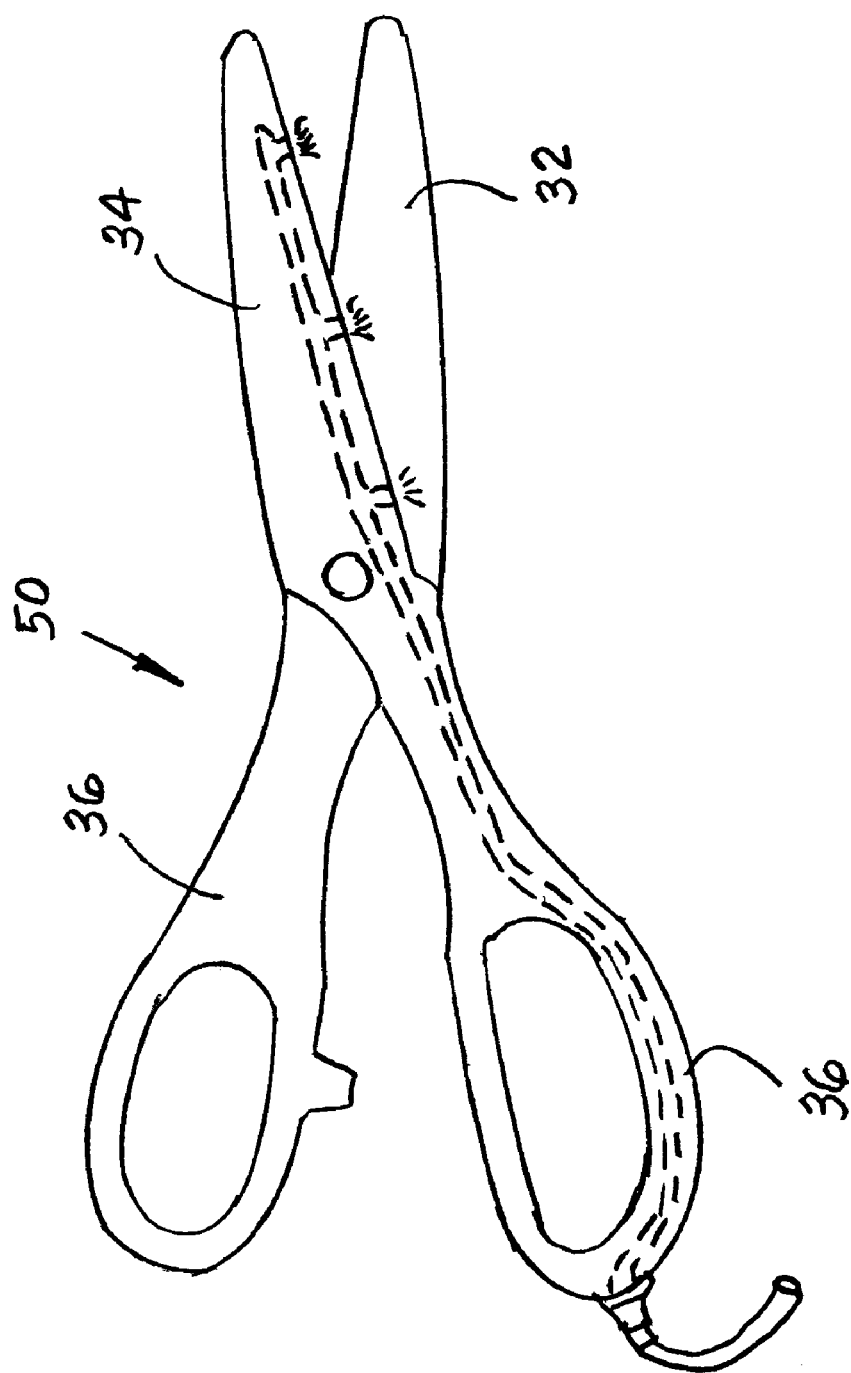
FIG. 5 is a plan view of rustproof scissors used in the present invention.
Figure 6:
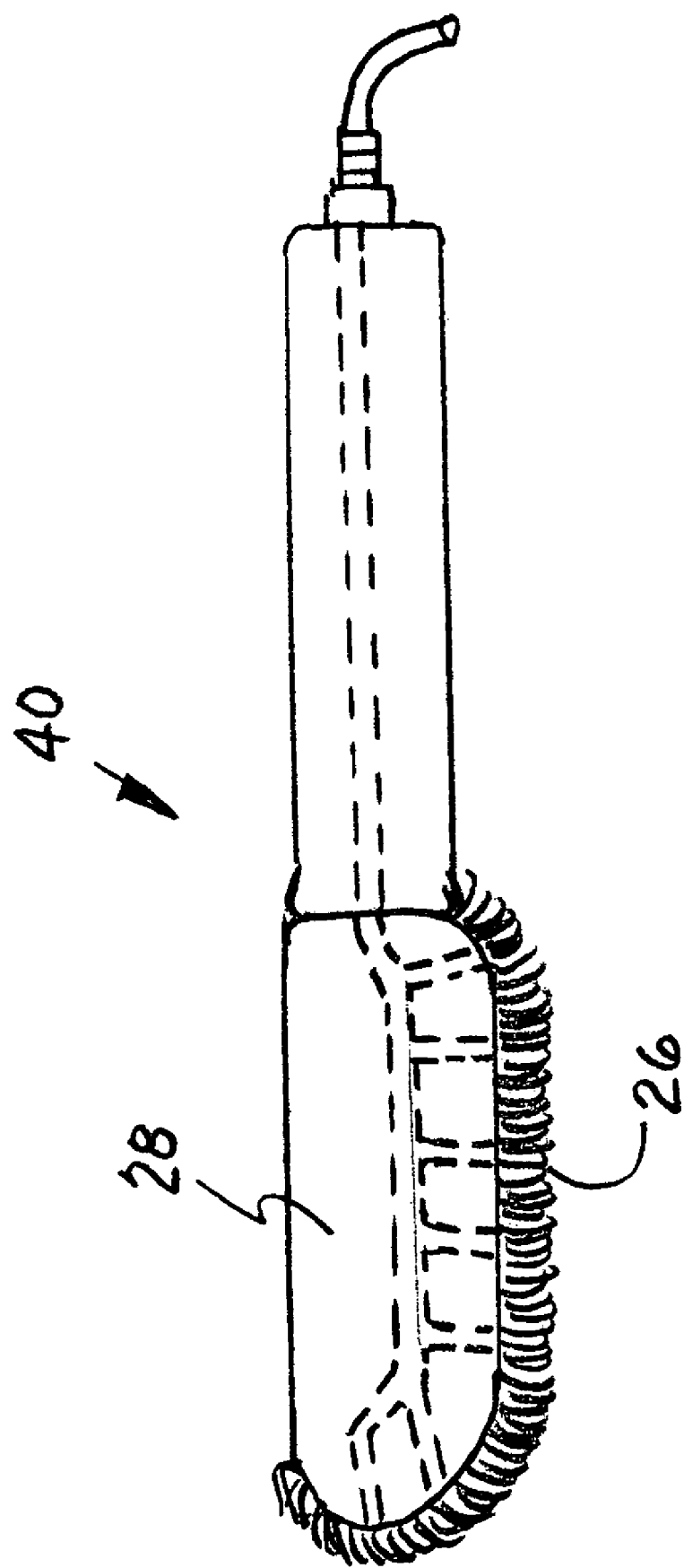
FIG. 6 is a side elevation view of a brush means used in the presently preferred embodiment of the apparatus.
Figure 7:
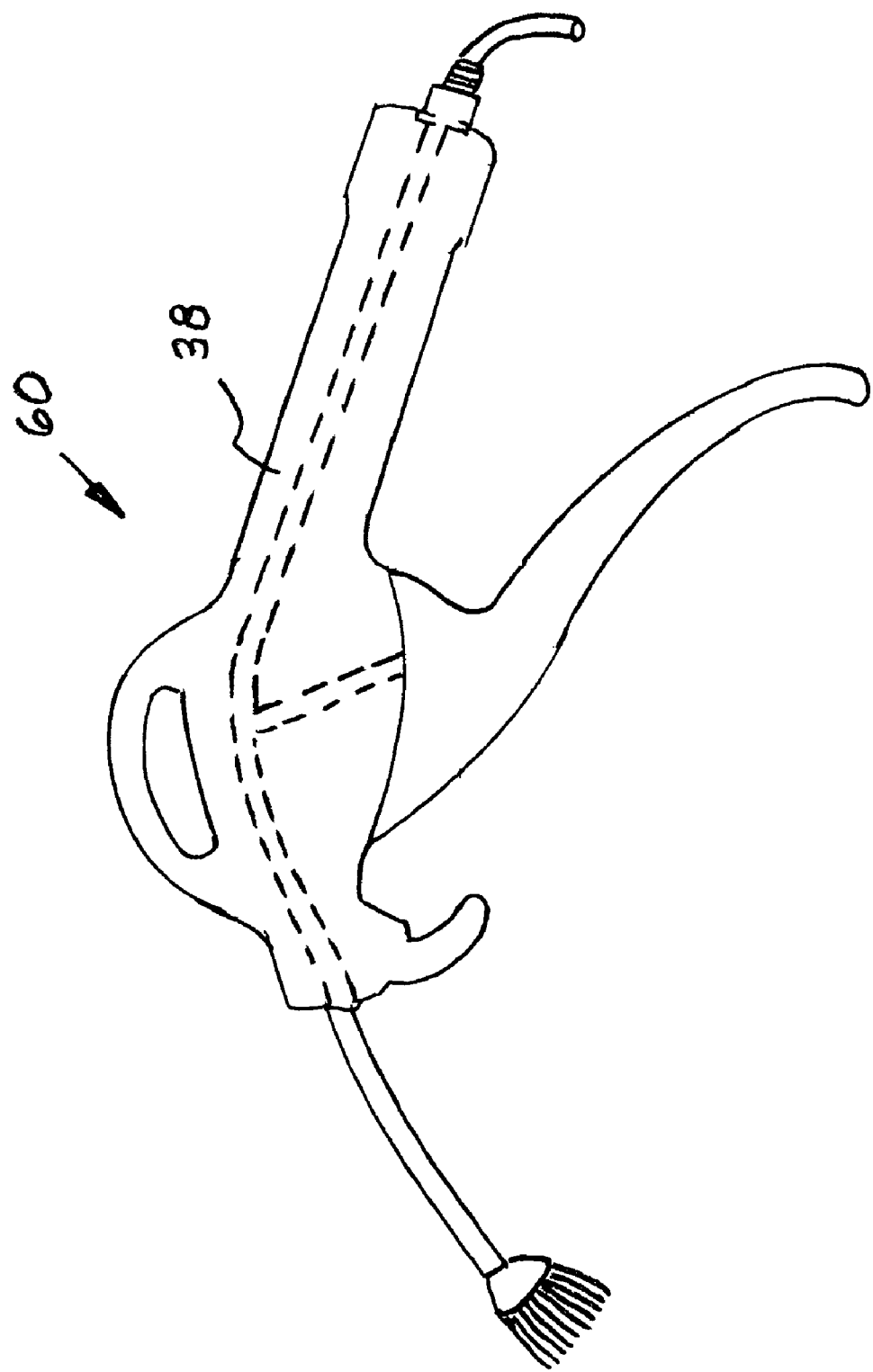
FIG. 7 is a side elevation view of the water nozzle used in the present invention.

Reference is now made, more particularly, to FIGS. 1-7. Illustrated therein is a presently preferred embodiment of an apparatus, generally designated 10, for cleaning fish. The apparatus 10 includes a scaling tool, generally designated 20, having each of as first predetermined shape and a first predetermined size. In the presently preferred embodiment of the invention, the scaling tool 20 includes a handle member 16 and said first water connection means is disposed at a predetermined end 14 of the handle member 16. The scaling tool 20 includes a plurality of teeth 18 disposed thereon.

There is a first water connection means 12 disposed at a predetermined end 14 of such handle member 16 for connecting the scaling tool 20 to a source of water, generally designate 30.

At least one scaling tool 20 water communication outlet port 22 formed in the scaling tool 20 at a predetermined location for allowing water to exit the scaling tool 20.

Additionally, there is at least one water communication channel 24 connected at a first end thereof to the first water connection means 12 and at a second end thereof to the at least one scaling tool water communication outlet port 22 for communicating water from the water source to outlet port 22.

Apparatus 10 further includes a brush means, generally designate 40, having each of a second predetermined shape, a second predetermined size and a predetermined stiffness for cleaning a belly, a head and a body such fish. In the presently preferred embodiment of the invention, the predetermined stiffness of bristles 26 of the brush means 40 includes hard, medium and soft stiffness. Such bristles 26 are preferably formed from one of plastic and aluminum and a combination thereof.

A second water connection means 12 disposed at a predetermined end of the brush means 40 for connecting such brush means 40 to a source of water.

There is at least one brush means 40 water communication outlet port 22 formed in the brush means 40 at a predetermined location for allowing water to exit the brush means 40.

Also, there is at least one water communication channel 24 connected at a first end thereof to the second water connection means 12 and at a second end thereof to the at least one brush means 40 water communication outlet port 22 for communicating water from the water source to the outlet port 22.

In the presently preferred embodiment of the invention, the brush means 40 includes a predetermined number of interchangeable heads 28.

Apparatus 10 additionally includes rustproof scissors, generally designated 50. These rustproof scissors 50 have a pair of blades 32 having a predetermined length. Such rustproof scissors 50 have a steel base with a rustproof coating 34 applied thereto.

A third water connection means 12 is disposed at a predetermined end of a predetermined one of a handle member 36 connected to one end of each of the pair of blades 32 for connecting the rustproof scissors 50 to a source of water.

At least one rustproof scissors 50 water communication outlet port 22 is formed in a predetermined one of the pair of blades 32 at a predetermined location for allowing water to exit such predetermined one of the pair of blades 32.

Furthermore, there is at least one water communication channel 24 connected at a first end thereof to the third water connection means 12 and at a second end thereof to the rustproof scissors 50 water communication outlet port 22 for communicating water from the water source to the outlet port 22.

The final essential component of the apparatus 10 is a water nozzle, generally designated 60, having a predetermined number of spray patterns. Preferably, the housing 38 of water nozzle 60 is plastic.

There is a fourth water connection means 12 which is disposed at a predetermined end of the water nozzle 60 for connecting the water nozzle 60 to a source of water. At least one water nozzle 60 water communication outlet port 22 formed in the water nozzle 60 at a predetermined location for allowing water to exit the water nozzle 60.

Also, at least one water communication channel 24 is connected at a first end thereof to the fourth water connection means 12 and at a second end thereof to the at least one water nozzle 60 water communication outlet port 22 for communicating water from the source to the outlet port 22.

According to a second embodiment, the invention provides a combination of a fish cleaning station, generally designated 70, having at least one sink 42, a drain table 44 sloped to the at least one sink 42 for holding a fish to be cleaned and a source of water 46 with the apparatus 10 for cleaning fish. The apparatus 10 has been described above in detail and such description will not be repeated here.

In the presently preferred embodiment of the invention, the combination will further include flexible tubing 48 connected to the valve means 52 and the water connection means 12 of each of the scaling tool 20, the brush means 40, the scissors 50 and the water nozzle 60. Preferably, the flexible tubing 48 includes braiding to enable use with both hot and cold water.

In both the first and second embodiments of the invention each of the scaling tool 20, the brush means 40 and the rustproof scissors 50 include a predetermined plurality of outlet ports 22.

Additionally, in each of the embodiments a first one of the first predetermined size is sized to scale fish having a length of between about 5.0 inches to about 20.0 inches and a second one of the first predetermined size is sized to scale fish having a length of between about 20.0 inches to about 48.0 inches.

Further, in each of the embodiments of the invention, the scaling tool 20, the brush means 40 and the scissors 50 includes a plurality of outlet ports 22 arranged in a predetermined pattern.

Likewise, in each of the embodiments of the invention, the water nozzle 60 has a plurality of predetermined spray patterns. These predetermined spray patterns at least include a wide spray pattern and a standard spray pattern.

Finally, the combination further includes a valve means 52 for regulating water pressure.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

We claim:

1. An apparatus for cleaning fish, said apparatus comprising:
   (a) a scaling tool having each of as first predetermined shape and a first predetermined size;
   (b) a first water connection means disposed at a predetermined end of said scaling tool for connecting said scaling tool to a source of water;
   (c) at least one scaling tool water communication outlet port formed in said scaling tool at a predetermined location for allowing water to exit said scaling tool;
   (d) at least one water communication channel connected at a first end thereof to said first water connection means and at a second end thereof to said at least one scaling tool water communication outlet port for communicating water from said source to said outlet port;
   (e) a brush means having each of a second predetermined shape, a second predetermined size and a predetermined stiffness for cleaning a belly, a head and a body such fish;
   (f) a second water connection means disposed at a predetermined end of said brush means for connecting said brush means to a source of water;
   (g) at least one brush means water communication outlet port formed in said brush means at a predetermined location for allowing water to exit said brush means;
   (h) at least one water communication channel connected at a first end thereof to said second water connection means and at a second end thereof to said at least one brush means water communication outlet port for communicating water from said source to said outlet port;
   (i) a rustproof scissors, said rustproof scissors having a pair of blades having a predetermined length;
   (j) a third water connection means disposed at a predetermined end of a predetermined one of a handle member connected to one end of each of said pair of blades for connecting said rustproof scissors to a source of water;
   (k) at least one rustproof scissors water communication outlet port formed in a predetermined one of said pair of blades at a predetermined location for allowing water to exit said predetermined one of said pair of blades;
   (l) at least one water communication channel connected at a first end thereof to said third water connection means and at a second end thereof to said rustproof scissors water communication outlet port for communicating water from said source to said outlet port;
   (m) a water nozzle having a predetermined number of sprays;
   (n) a fourth water connection means disposed at a predetermined end of said water nozzle for connecting said water nozzle to a source of water;
   (o) at least one water nozzle water communication outlet port formed in said water nozzle at a predetermined location for allowing water to exit said water nozzle; and
   (d) at least one water communication channel connected at a first end thereof to said fourth water connection means and at a second end thereof to said at least one water nozzle water communication outlet port for communicating water from said source to said outlet port.

2. An apparatus for cleaning fish, according to claim 1, wherein said scaling tool includes a handle member and said first water connection means is disposed at an end of said handle member.

3. An apparatus for cleaning fish, according to claim 2, wherein said scaling tool includes a plurality of teeth disposed thereon.

4. An apparatus for cleaning fish, according to claim 1, wherein said predetermined stiffness of bristles of said brush means includes hard, medium and soft stiffness.

5. An apparatus for cleaning fish, according to claim 1, wherein said bristles are formed from one of plastic and aluminum and a combination thereof.

6. An apparatus for cleaning fish, according to claim 1, wherein said rustproof scissors have a steel base with a rustproof coating applied thereto.

7. An apparatus for cleaning fish, according to claim 1, wherein said water nozzle has a plastic housing.

8. In combination with a fish cleaning station having at least one sink, a drain table sloped to said at least one sink for holding a fish to be cleaned and a source of water, the improvement comprising an apparatus for cleaning fish, said apparatus including:
   (a) a scaling tool having each of as first predetermined shape and a first predetermined size;
   (b) a first water connection means disposed at a predetermined end of said scaling tool for connecting said scaling tool to a source of water;
   (c) at least one scaling tool water communication outlet port formed in said scaling tool at a predetermined location for allowing water to exit said scaling tool;
   (d) at least one water communication channel connected at a first end thereof to said first water connection means and at a second end thereof to said at least one scaling tool water communication outlet port for communicating water from said source to said outlet port;
   (e) a brush means having each of a second predetermined shape, a second predetermined size and a predetermined stiffness for cleaning a belly, a head and a body such fish;
   (f) a second water connection means disposed at a predetermined end of said brush means for connecting said brush means to a source of water;
   (g) at least one brush means water communication outlet port formed in said brush means at a predetermined location for allowing water to exit said brush means;
   (h) at least one water communication channel connected at a first end thereof to said second water connection means and at a second end thereof to said at least one brush means water communication outlet port for communicating water from said source to said outlet port;
   (i) a rustproof scissors, said rustproof scissors having a pair of blades having a predetermined length;
   (j) a third water connection means disposed at a predetermined end of a predetermined one of a handle member connected to one end of each of said pair of blades for connecting said rustproof scissors to a source of water;
   (k) at least one rustproof scissors water communication outlet port formed in a predetermined one of said pair of blades at a predetermined location for allowing water to exit said predetermined one of said pair of blades;
   (l) at least one water communication channel connected at a first end thereof to said third water connection means and at a second end thereof to said rustproof scissors water communication outlet port for communicating water from said source to said outlet port;
   (m) a water nozzle having a predetermined number of sprays;
   (n) a fourth water connection means disposed at a predetermined end of said water nozzle for connecting said water nozzle to a source of water;

(o) at least one water nozzle water communication outlet port formed in said water nozzle at a predetermined location for allowing water to exit said water nozzle; and (p) at least one water communication channel connected at a first end thereof to said fourth water connection means and at a second end thereof to said at least one water nozzle water communication outlet port for communicating water from said source to said outlet port.

9. The combination, according to claim 8, wherein said combination further includes valve means engageable with a faucet connected to said source of water for supplying water to each of said scaling tool, said brush means, said scissors and said water nozzle.

10. The combination, according to claim 9, wherein said combination further includes flexible tubing connected to said valve means and said water connection means of each of said scaling tool, said brush means, said scissors and said water nozzle.

11. The combination, according to claim 10, wherein said flexible tubing includes braiding to enable use with both hot and cold water.

12. The combination, according to claim 8, wherein each of said scaling tool, said brush means and said scissors include a predetermined plurality of outlet ports.

13. The combination, according to claim 8, wherein a first one of said first predetermined size is sized to scale fish having a length of between about 5.0 inches to about 20.0 inches and a second one of said first predetermined size is sized to scale fish having a length of between about 20.0 inches to about 48.0 inches.

14. The combination, according to claim 8, wherein said brush means has a predetermined number of interchangeable heads.

15. The combination, according to claim 8, wherein said scaling tool includes a plurality of outlet ports arranged in a predetermined pattern.

16. The combination, according to claim 8, wherein said brush means includes a plurality of outlet ports arranged in a predetermined pattern.

17. The combination, according to claim 8, wherein said scissors includes a plurality of outlet ports.

18. The combination, according to claim 8, wherein said water nozzle has a plurality of predetermined spray patterns.

19. The combination, according to claim 18, wherein said predetermined spray patterns at least include a wide spray pattern and a standard spray pattern.

20. The combination, according to claim 8, wherein said combination further includes a means for regulating water pressure.

* * * * *